Dec. 24, 1957 D. K. BICKEL ET AL 2,817,619
PROCESS FOR PREPARING POLYESTER-FACED BODIES
Filed July 2, 1954

DAVID K. BICKEL
STEPHEN J. MITTL
INVENTORS

BY G. G. Christensen
ATT'Y

United States Patent Office 2,817,619
Patented Dec. 24, 1957

2,817,619

PROCESS FOR PREPARING POLYESTER-FACED BODIES

David K. Bickel and Stephen J. Mittl, Reading, Pa., assignors to The Glidden Company, Cleveland, Ohio, a corporation of Ohio Application July 2, 1954, Serial No. 441,152

3 Claims. (Cl. 154—110)

This invention relates to a process for preparing bodies composed of or comprising a cured polyester resin mass as a backing on the surface of which is integrally attached an exposed or finish layer of clear or pigmented polyester resin. The invention contemplates the provision of either finish layers of a monotone appearance, or finish layers combining two or more different colors or resinous masses in any desired arrangement or pattern.

Various polyester resins (alkyd resins prepared mainly from saturated polyhydric alcohols and ethylenically-unsaturated polycarboxylic acids) and various resinous products which combine polyester resins with polymerizable ethylenically unsaturated monomers are well known compositions of matter, and are well known to possess and exhibit excellent hardness, abrasion resistance, toughness, mar resistance, chemical resistance and wear resistance, and accordingly are well suited for use as protective finishes for indoor and outdoor exposure. Such resinous compositions are, moreover, excellent binders and molding materials and hence can be used prominently in a wide variety of finished products. When used as a binder for glass fibers and like reinforcing material, molded articles of excellent mechanical strength can be produced.

The foregoing advantageous properties of polyesters and polyester-monomer combinations, however, are beset with one disadvantage in particular; namely, that to the best of the applicants' present knowledge, few known paints, inks, or conventional coating compositions other than certain lacquers will adhere satisfactorily to the cured surface of such resinous materials. This quality, while advantageous in many respects, is a definite disadvantage from the standpoint of applying markings, legends, insignia, decorations, etc. to cured surfaces of the resins. Thus, such markings as trademarks, trade names, manufacturer's name and address, quality or grade designations, and the like cannot be affixed permanently in any simple manner. Moreover, it has not heretofore been possible to make such products as signs, name-plates, license plates and many other products carrying indicia of one sort or another from such resins since the indicia will not adhere to the resins if painted, printed, stencilled, or otherwise conventionally applied thereon.

Poor adherence to the cured surfaces of such resins is also a disadvantage in another direction. Polyester or polyester-monomer resins are currently being used rather extensively in making a variety of reinforced decorative and/or structural materials as automobile bodies, safety helmets, lamp shades, canopy material in corrugated sheet form, light weight bath-tubs for automobile trailers, and many other objects. In most instances certain of the reinforcing fibers are very close to the surface of the finished objects and in some instances may penetrate the surface. If the surface is sanded in an effort to cut off the protruding reinforcing fibers the very act of abrading the surface exposes new fibers which further detract from the desired smooth, pore-free surface. Moreover, each exposed reinforcing fiber functions as a wick in leading moisture through the cured mass of polyester. For example, glass-fiber-reinforced polyester tubing is not watertight because of the wick action of fibers which penetrate through the inner surface of the tubing.

Our process involves the concept of building up the desired finished body inwardly from the desired smooth, defect-free outer surface, rather than to build it from the inside out, as has heretofore been attempted. By proceeding in this way, the desired outer surface can be provided in the form, quality, color and pattern sought, whether that be a fiber-free and pore-free surface of a single homogeneous color, a sign exposing an outer surface of two or more colors, or a decorative surface having an appearance and pattern resembling wood, marble, or otherwise. In carrying out our concept, the desired outer surface is provided first of all by applying a selected gelable polyester composition to an appropriate mold surface and then is gelled in place on said mold surface without being cured; then a desired polyester mass reinforced or not can be applied on top thereof and in some instances gelled without being fully cured, and then (if desired) structural and/or reinforcing members of metal, stone, rock, concrete or the like can be applied on top of the gelled but uncured mass. The entire assembly so built up can then be treated to cure the various resin layers simultaneously, as by heat alone, or by combinations of heat and pressure, to give a finished body having all of the various layers and masses integrally united each to another and to any structural members employed therein, thereby to provide a body having a durable, smooth, glossy, abrasion- and chemical-resistant outer surface carrying any desired legends, indicia or patterns as an integral part of that outer surface.

Of fundamental importance to the process outlined above is the concept and provision of a polyester or polyester-monomer mass which can be converted in its entirety to a fairly rigid state while yet not being in a fully cured condition. The fairly rigid state, hereinafter referred to as the gel state, permits each layer to be applied and converted to a condition of moderate rigidity before the next layer or mass is laid upon it. After the desired assembly of layers and/or masses has been completed, the entire assembly of gelled resinous masses therein can be further converted to a fully cured and inter-bonded condition.

Accordingly, it is an object of the present invention to provide a process wherein intercalated layers of gelled but incompletely cured polyester resin are subsequently integrally bonded together.

It is another object to bond layers and/or masses of differently colored and/or pigmented polyester resin together, and in the course thereof to produce an outer or exposed surface of cured polyester resin which is smooth, glossy and free of such reinforcing fibers or particles as may be used in layers and/or masses of polyester resin which are integrally united with said outer surface and which reinforce and support the said outer surface.

It is still another object to provide a process for preparing molded objects having a smooth, pore-free outer surface of polyester resin, which surface carries desired indicia therein as an integral part of said surface, whereby signs, license plates and other indicia-carrying objects can be so fabricated that at least the exposed surface of the object is composed mainly of polyester and/or polyester-monomer resin(s).

These and other objects will be apparent from the following examples of the invention, taken in conjunction with the attached drawings in which.

EXAMPLE 1

Building block faced with polyester resin

This example illustrates the principles of the invention as applied to the preparation of a faced porous building block whose dimensions are approximately 8″ x 8″ x 16″. From what has been said above, it will be understood that the object of facing the building block is to provide at least one smooth, non-porous, exposure-resistant facing on the block to present any desired color or color pattern. Such faced blocks can be laid up so as to form a wall presenting their resin-faced surfaces either to an inside room of a structure, or to the weather side of the wall. The blocks may, of course, be faced on both sides. Where the facings are exposed to the weather, they provide an exterior surface which needs no painting, which is water-tight, which stays clean by reason of its smoothness and weather resistance, and which is mar resistant by reason of its toughness, abrasion resistance and hardness. Where the facings are presented to interior rooms of a structure, they afford many of the advantages mentioned above plus ease of cleaning, retention of color, brightness and decorative qualities, excellent durability and a certain degree of fire-resistance. Such a surface seldom needs to be more than a few thousandths of an inch thick but in commercial practice may be as much as $30/1000$ of an inch thick. Any desired thickness can, of course, be used. Under the just-described outer layer will be a resinous layer which has been pigmented and/or filled or reinforced with appropriate materials, the pigmentation giving a sub-surface layer of desired hiding qualities with the fillers and reinforcement functioning to extend or bulk the resin while yet providing a strong, dense layer capable of adequately supporting the non-porous exposed surface layer. The intermediate layer must of course be firmly bonded both to the exposed surface layer and to the cinder block.

Figure 1:
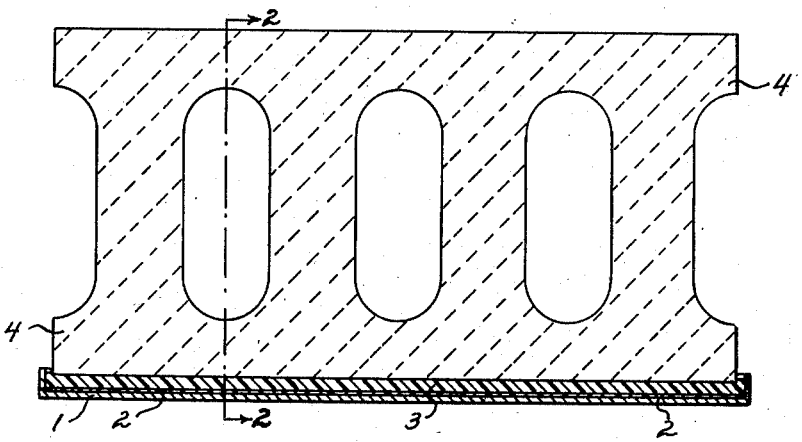
Fig. 1 is a vertical longitudinal sectional view of a building block as positioned in a tray for applying a composite facing thereto.
Figure 2:
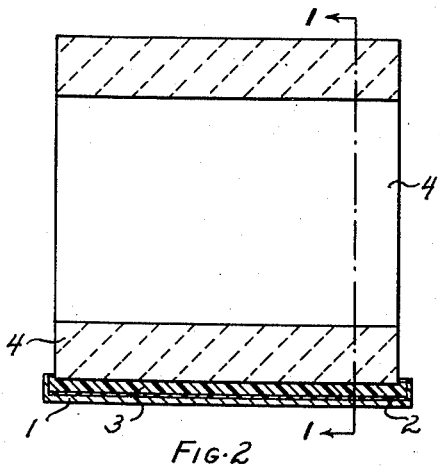
Fig. 2 is a vertical cross-sectional view taken on the line 2—2 of Fig. 1.

A faced block of the structure just described can be prepared in the following manner, reference being had to Figs. 1 and 2 of the attached drawings.

The inside surface of a clean metal tray 1 having dimensions of about 8″ x 16″ in plan view and about ½″ deep is sprayed to a thickness of about 5 to 10 mils with a catalyzed 100% polymerizable, gelable resinous polyester mass formulated as follows, thereby to provide a layer 2 in the tray.

Formulation

| | |
|---|---|
| Rutile TiO$_2$ | 3 lbs. 3 oz. |
| Chrome green (med.) | 3 oz. |
| Kieselguhr | 2 lbs. 10 oz. |
| Polyester A | 77 liquid ounces. |
| Polyester B | 32 liquid ounces. |
| Polyester C | 20 liquid ounces. |

Polyester A is a liquid heat-hardenable polyester composition prepared from the following ingredients:

| | Lbs. |
|---|---|
| Propylene glycol | 29.60 |
| Maleic anhydride | 16.90 |
| Phthalic anhydride | 25.45 |
| Styrene | 28.20 |
| Xylol | 5.76 |
| 4-tert-butyl catechol | .009 |
| Choline chloride [1] | .047 |
| Propylene glycol [1] | .010 |
| | 105.976 |

[1] Paste.

Polyesters B and C are similar heat-hardenable compositions, formulated as indicated below:

Polyester B

| | Lbs. |
|---|---|
| Propylene glycol | 29.90 |
| Maleic anhydride | 17.50 |
| Adipic acid | 26.10 |
| Styrene | 27.35 |
| Xylol | 5.88 |
| 4-tert-butyl catechol | .009 |
| Choline chloride [1] | .456 |
| Propylene glycol [1] | .10 |

[1] Stabilizer paste.

Polyester C

| | Lbs. |
|---|---|
| Diethylene glycol | 46.2 |
| Maleic anhydride | 19.4 |
| Adipic acid | 28.9 |
| Styrene | 36.0 |
| Xylol | 7.5 |
| 4-tert-butyl catechol | .012 |
| Choline chloride | .06 |

These three polyester compositions can be prepared individually by esterifying the polyhydric alcohol(s) and polycarboxylic acids in the presence of xylol as the first step, then the volatiles are stripped off and, after cooling, the stabilizers and styrene are added. The resulting compositions are 100% polymerizable.

By adding 1% of methylethylketone peroxide and 1% of 0.2% cobalt naphthenate solution to the tri-polyester formulation, the sprayed coating is converted in a few minutes to a fairly firm gelled condition at room temperature, and by adding 1% of benzoyl peroxide or 1% methylethylketone peroxide the sprayed layer 2 can be gelled at 225° F. in about 1 to 3 minutes. A suitable backing-and-bonding mass formulated as follows is then added to the tray in an amount of about 1.5 lbs. to form a layer 3.

Formulation of backing-and-bonding mass

| | Lbs. |
|---|---|
| Rutile TiO$_2$ | .6 |
| Wollastonite (Ca silicate) | .4 |
| Silica sand (fine, white) | 45.5 |
| Moonsand (silica sand) | 8.5 |
| Chrome green (medium) | .036 |
| Styrene | 5.9 |
| Polyester A (above) | 7.2 |
| | 68.136 |

The mass is catalyzed for curing by incorporating 0.5%–1.0% of methylethylketone peroxide, t-butyl peroxide or benzoyl peroxide.

The above backing-and-bonding mass is a thick, creamy material which can be poured into the tray and spread easily therein. It has enough body to carry the weight of the cinder block without being squeezed out of the tray. The cinder block 4 is then positioned in the tray with one face thereof resting upon the layer 3 of bonding mass as shown in Figures 1 and 2. Additional backing-and-bonding material can then be introduced between the edges of the block and the sides of the tray to completely hide the face which is being coated. The tray with its entire assembly is next passed into an oven where the whole unit is heated at 350° F. for about 45 minutes, thereby curing the gelled polyester resin layer 2 and the layer 3 of backing-and-bonding mass, and bonding them to each other and to the cinder block. On emergence from the oven, the tray 1 can be easily removed from the cured assembly and returned for use in preparing another cured assembly, since the above formulations do not adhere to the tray after being cured.

The advantages of this process are:

(1) The first-applied gelled coating 2 cures to a dense, pore-free, smooth surface of desired uniform color and presents the physical and chemical properties of the selected polyester resin as the wearing face of the block.

(2) The second-applied gelled layer 3 is relatively high in pigment and filler and low in resin content and hence of moderate total cost even though being used in appreciable volume (e. g., about 1.5 lbs. per face) to give hiding, bonding, pore-filling, and leveling-out between the first gelled coat and non-flat block faces. It normally would not be glossy because of its pigment:binder ratio, and even if not porous, would seldom permit sanding or abrasion without showing a readily-apparent blemish where the sanding occurred. It is inferior as an exposed face for these and other reasons, and for architectural appeal and maximum durability should be overlaid with the first-applied gelled layer. Heretofore, however, there was no known way to adhere an overlay to such highly pigmented layer.

(3) By the present process, however, the overlay 2 and the pigmented backing layer 3 can be applied in registering juxtaposition in an uncured state, and then cured simultaneously. By such curing treatment, the layers are bonded integrally to each other and to the face of the block 4.

(4) The sequence and conduct of the operations permits blocks to be faced on a commercial basis with a high yield of merchantable product.

EXAMPLE 2

In this example, the principles of our invention are exemplified by the preparation of a vehicle license plate in which the main body of the plate is composed of glass-fiber-reinforced, colored, polyester resin, and the numerals and other indicia thereon are composed of pigmented polyester resin of a contrasting color integrally bonded to the body of the plate. In this example it is assumed that the legible face of the plate is to be flat and smooth; that is, that the numerals and other indicia are neither embossed nor engraved with respect to the plane of the legible face of the plate.

Figure 3:
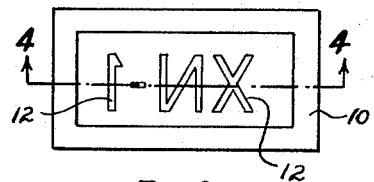
Fig. 3 is a plan view of a mold for a license plate, showing identifying characters which have been sprayed on the bottom face of the mold by means of a reverse stencil.
Figure 4:
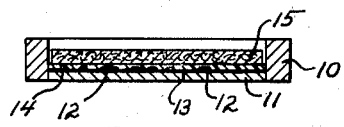
Fig. 4 is a vertical sectional view of the mold of Fig. 4 as taken on the line 4—4 after additional layers of materials have been provided therein, said view having its vertical dimensions greatly enlarged.
Figure 5:
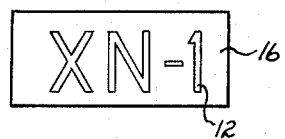
Fig. 5 is a plan view of the completed license plate after being ejected from the mold.

One method which can be used to prepare such a license plate is as follows, reference now being made to Figs. 3-5.

A mold 10 is provided in which mold there is a shallow rectangular cavity conforming in horizontal dimensions to the length and width of the desired plate. The cavity terminates in its downward vertical direction in a flat bottom wall or follower plate 11 suitably ground and polished to a smoothness consistent with the smoothness which is desired on the legible face of the finished license plate.

A negative stencil having the indicia of the desired plate represented as reverse openings extending entirely through the stencil is disposed on said bottom wall so as to block out all of said wall except that which is exposed through the negative indicia openings of the stencil. A polyester resin coating 12 of a few mils in thickness and of desired color (e. g., blue) is then sprayed on the exposed portions of the bottom wall to deposit a coating which in color and disposition will constitute the legible numerals and indicia of the finished license plate. The stencil is removed, and the sprayed coating 12 is gelled by heating it at 225° F. for 1 to 3 minutes. The blue coating so sprayed can be formulated as follows:

| | |
|---|---|
| Indanthrene Blue | 2 oz. |
| Kieselguhr | ½ lb. |
| Polyester A above | 2 lb. 10 oz. |
| Polyester B above | 76 liquid oz. |
| Polyester C above | 32 liquid oz. |
| $TiO_2$ | 20 liquid oz. |
| Benzoquinone (1% para, in styrene monomer) | 2 liquid oz. |

Catalysts of the kinds and amounts used with the tripolyester formulation of Example 1 are added shortly before the coating is sprayed. After the stencilled coating has been gelled, a coat 13 of differently-colored (e. g., orange) polyester resin coating similarly catalyzed is then sprayed over the whole bottom wall and over the blue indicia thereon, the color being that which is desired as the background of the license plate. The orange coat can be formulated as follows:

| | |
|---|---|
| Chrome yellow (light) | 5 oz. |
| Chrome orange (light) | 2 oz. |
| Kieselguhr | 2 lbs. 10 oz. |
| Polyester A (above) | 77 liquid oz. |
| Polyester B (above) | 32 liquid oz. |
| Polyester C (above) | 20 liquid oz. |
| Benzoquinone (1% para, in styrene monomer) | 2 liquid oz. |

The coating is sprayed to a thickness of about 5 to 10 mils and then is gelled by heating at 225° F. for about 1 to 3 minutes. A catalyzed polyester molding resin 14 in liquid form and formulated as follows:

| | |
|---|---|
| Wallastonite (Ca silicate) | 2 lbs. |
| Chrome-yellow, light, C. P. | 5/16 lb. |
| Chrome-orange, light, C. P. | ⅓ lb. |
| Polyester A, above | 7.5 pints. |
| Polyester C, above | 0.5 pint. |
| Benzoyl peroxide catalyst | 1% by weight. | and a preformed mat 15 of glass-fiber are introduced into the cavity on top of the second gelled coat 13, and then the entire contents of the cavity is pressed under a pressure of about 20 lbs. per square inch for 1 to 4 minutes at 225° F., thereby to mold the resin and glass-fiber into the form of the main body of the license plate, and simultaneously to cure and bond the various layers of polyester resin into an integral unit. The cured assembly can then be ejected from the mold. Examination of the finished license plate 16 reveals it to be a tough, flexible, light-weight plate having blue indicia on an orange background with the blue indicia corresponding in reverse to the stencil used in applying the first coating to the bottom wall of the mold cavity. The blue indicia form a smooth planar face with the orange front face of the body and are integrally united with the body.

From the foregoing examples it will be clear that the invention provides a process by which polyester resins can be integrally and permanently bonded to other layers or masses of polyester resin(s) as well as to other materials, the fundamental principle involved being that two or more polyester masses can be juxtaposed in an uncured state when at least one of them is in a gelled condition, and then can be subsequently bonded together during the curing of the masses. The principles can be applied widely in the fabrication of innumerable and diverse products, of which only two are illustrated in the foregoing examples.

While the examples have illustrated the application of the first- or exterior-coat to a molding surface by spraying, other conventional methods of application can of course be used, as by brushing, by silk screening, roller coating, printing, etc. so that designs of any desired simplicity or complexity can be applied by appropriate methods and apparatus. In like manner, the second coat can be applied in any desired manner to provide an overall, uniform coat or as a design coat cooperating with the first to present ultimately the desired color patterns. Thus, where a grained pattern resembling wood grain is desired, two or more patterned color coats may need to be applied before a reasonable facsimile of a wood pattern has been developed. A third over-all coat may then be needed to fill in the voids of the first two and to complete the pattern and the bonding system by which all of the colors become permanently bonded to each other and to the subsequently applied backing. Various other ways of adapting the principles of our invention to particular ornamenting and/or legend affixing situations will be apparent to those skilled in the art.

It will be appreciated that in carrying out the principles of our invention, one can use any of a large number of known resin or resin mixtures of the types commonly referred to as "unsaturated polyesters." The latter term used here as above to mean resinifiable masses containing or composed of organic polycarboxylic acid esters which are polymerizable mainly by reason of ethylenic unsaturation in the polycarboxylic acid radicals and which are employed either by themselves or in combination with polymerizable ethylenically-unsaturated compounds (e. g., styrene) usually in monomeric or low-polymer form. It should be understood, however, that such unsaturated polyester resins need not be free of saturated polyesters or other heat-convertible modifying resins, and that various modifying polymerizable, saturated polyester resins or convertible resinous masses (e. g., alkyds) can be used in minor to prominent amounts therein. It should also be understood that the unsaturated polyesters and/or mixtures of saturated and unsaturated polyesters can be modified in a variety of other ways well known to those skilled in the art. The following patent specifications are referred to as indicating the scope of the unsaturated polyester resin art which can be employed in practicing the principles of our invention: U. S. Patents 2,512,410, 2,593,787, 2,280,256, 2,453,666, 2,443,736, 2,443,737, 2,409,633, 2,610,168 2,635,089 and the copending applications Ser. No. 307,703, filed September 3, 1952, now abandoned, and Ser. No. 377,265, filed August 28, 1953, now Patent No. 2,777,829.

It is well known to those skilled in the unsaturated polyester resin art that 100% polymerizable polyester liquids can be suitably formulated to be curable to a gelled state in advance of the fully-cured state. Curing of the liquids involves exothermic reactions, which exothermicity tends to accelerate the reactions. If polymerization is uncontrolled, as by the non-use of known polymerization stabilizers and/or inhibitors, the reactive mass cannot be easily kept from proceeding to its fully cured state, but by including appropriate polymerization stabilizers and/or inhibitors, the mass can be rendered amenable to a gelling treatment in advance of the final curing treatment. The examples illustrate the use of inhibitors, stabilizers and pigmentation to control the reactivity so that the desired gelled but uncured state can be attained controllably in advance of the fully cured state. In general, gelable polyester masses of the types herein described and illustrated above are 100% polymerizable and are usually mixtures of two or more unsaturated polyester types or formulations with or without polymerizable ethylenically-unsaturated monomeric material. Nevertheless, a single polyester type or formulation can be used by itself, just as well. It is more common, though, to mix two or more different ones together since in this way a few stock resin types or formulations can be maintained and from them a large number of blends can readily be prepared. The stock formulations are commonly distinguished from each other on the basis of the rigidity or flexibility of the resins they yield. Thus one might give a flexible resin, another might give a semi-rigid resin, and a third might give a rigid resin. The compositions identified hereinabove as Polyester A, Polyester B and Polyester C correspond in principle with this practice, and their various blends (as in the examples) give cured resinous coatings of various degrees of rigidity, selected for the type of service for which the finished product is intended. Those skilled in the art of formulating unsaturated polyester resins recognize that the proportions of saturated carboxylic acids to $\alpha,\beta$ unsaturated carboxylic acids, the length of the carbon chain(s) involved in the carboxylic acids and in the polyhydric alcohols, the proportion of polyester to polymerizable unsaturated monomer (if any), the type of ethylenic monomer, the degree of functionality in the carboxylic acids and polyhydric alcohols, and the curing treatment(s), are all factors affecting the flexibility and/or rigidity of the cured resin. Since such knowledge is now known and has been long used by those skilled in the art, and is only an incidental feature in the present invention, no extended discussion of such formulation details seems necessary to enable a person skilled in the art to practice the present invention. In principle, the present invention can be practiced in connection with any 100% polymerizable polyester formulation or mixture of formulations which can be gelled in an incompletely cured state. As those skilled in the art are aware, this feature of being gelable without being fully cured can be imparted to any unsaturated polyester mass whether clear or pigmented by incorporating known polymerization catalysts, stabilizers and inhibitors in amounts and proportions which are fixed largely by the particular polymerizable polyester mass at hand. When that mass is pigmented, particularly with amounts and kinds of pigment which in the aggregate possess what is known in the art as high oil absorption, then a wholly different combination (i. e., kinds and/or amounts) of polymerization catalysts, stabilizers and inhibitors is apt to be needed than if the same polyester mass without any pigment therein were being formulated to secure the quality of gelability without full curing. For most purposes of the present invention, however, unpigmented gelable polyester coatings are apt to be of minor importance since the gelable coatings are usually desired for their hiding, extending and/or color-imparting qualities. Hence hiding and/or color pigments are usually included. Any of the usual pigments, inert fillers and extenders can be used, but it is desirable that they be free of or contain only small amounts of reactive metals such as iron, lead, zinc, etc. and/or their compounds. Inerts of high oil absorption (e. g., silicates, silica gel) are preferred, only enough high-hiding pigment being used to serve the purpose at hand. In highly pigmented gelable polyester masses, it is desirable to exclude zinc and lead pigments since they tend to stiffen the resulting mass. This stiffening effect is not objectionable in the more fluid, less-highly-pigmented formulations. The following formulations illustrate without limiting the latitude in pigmentation which can be utilized in formulating gelable 100% polymerizable materials for use in the present invention:

EXAMPLE 3

|  | Pints |
| --- | --- |
| Polyester A | 6.75 |
| Polyester B | .75 |
| Polyester C | 2.50 |

When mixed together, these polyesters give a product which is ready for use when catalyzed. The viscosity is 94 KU at 77° F. (Stormer).

Figure 6:
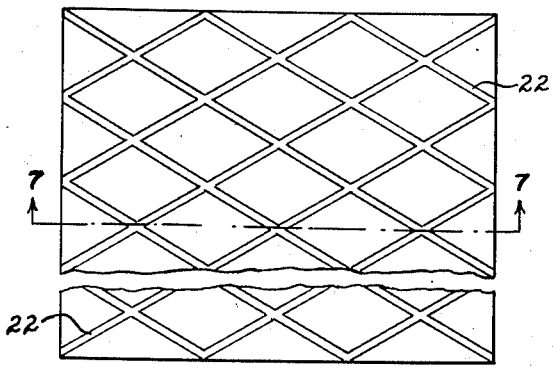
Fig. 6 is a plan view of an assembly such as could be prepared in accordance with the invention in making a decorated sheet of polyester foil.
Figure 7:
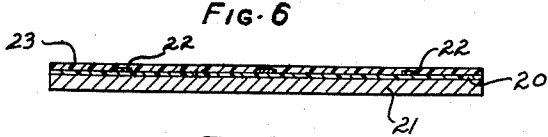
Fig. 7 is a vertical sectional view of the assembly of Fig. 6, taken on the line 7—7 and greatly enlarged in the vertical dimensions.

A clear polyester formulation such as this can be used in forming decorated transparent films, such as for wrapping, by applying a first layer 20 of the clear formulation on a support 21 as shown in Figs. 6 and 7, gelling it, then applying a colored polyester pattern layer 22 thereon, and finally applying one or more subsequent clear layers 23. The whole intercalated mass can then be cured to a tough film having a desired pattern incorporated between the opposite faces of the cured film.

EXAMPLE 4

| Polyester A | 4 gals., 45 fl. ozs. |
|---|---|
| Polyester C | 3 gals., 77 fl. ozs. |
| Magnesium silicate | [1] 24 lbs., 3 ozs. |
| White talc | [1] 24 lbs., 3 ozs. |
| TiO$_2$ | [2] 1 lb. |

[1] Low iron-content inerts.
[2] Hiding pigment.

These ingredients were charged into a mixer of the Baker-Perkins type and were thoroughly blended together. The resulting product, having a volume of about 10 gals., was ready for use in the invention when catalyzed with 1% methylethylketone peroxide (Lupersol DDM) and 1% of a cobalt octoate solution containing about 3% solids. The same catalysts are suitable for use with the formulation of Example 3. In both instances, the catalyst mixture is added at time of application. After being catalyzed, the formulations have a pot life of about 30 minutes. Accordingly, each batch should be used up promptly and before the next batch is catalyzed.

The numerous patents identified hereinabove exemplify not only the scope of the polyester formulations which we contemplate as being part of this invention, but also illustrate and describe some of the numerous polymerization catalysts, stabilizers and inhibitors which are known to be useful in such formulations. The catalysts of Examples 3 and 4 can be replaced with many other catalyst combinations of the types and kinds known to those skilled in the art.

Having now described our invention, what we claim is:

1. The process of making a rigid, reinforced structural unit provided with an exposed, formed and pore-free facing of polyester resin which comprises: providing a mold surface adapted to impart to a coating applied thereon a configuration and texture corresponding to that which is desired on the said exposed facing of said unit, applying on at least a part of said mold surface a gelable, liquid polyester coating as a first coating thereon; gelling said first coating without curing it fully; applying at least one additional and different gelable liquid polyester coating over said first coat and over any selected portions of said mold surface not previously coated by said first coat, thereby to provide multiple coats on at least selected portions of said mold surface; positioning a rigid, structural backing member which is to form the main body of the desired unit in contact with at least one of said additional coatings while the latter is in an ungelled condition, said contact extending over the area of said backing member which, in the finished article, is to be faced with polyester resin facing; then curing all polyester coatings while maintaining contact with said backing member, thereby bonding said coatings to each other and to said backing member at the respective points of contact of each with another; and finally removing the cured and bonded assembly from contact with said mold surface, said liquid polyester coatings being (1) polyhydric alcohol-polycarboxylic acid ester products characterized by original ethylenic unsaturation in at least some of the polycarboxylic acid radicals, and being (2) substantially 100% polymerizable to a gel state in advance of the fully-cured state.

2. The process as claimed in claim 1 wherein said first coating is applied over the whole of said mold surface, wherein said ungelled subsequent coating is pigmented to provide hiding of said backing member; and wherein said backing member is a preformed building block composed essentially of inorganic material, and is positioned so that one face thereof is substantially completely in contact with said ungelled subsequent coating while it is being fully cured, whereby said building block is integrally bonded over one face thereof to said first and subsequent coatings.

3. The process as claimed in claim 1 wherein said first coating is applied in a predetermined pattern over only a portion of said mold surface; wherein at least one subsequent coating of different appearance when cured covers any voids on said mold surface left uncoated by previous coatings and is gelled without complete curing before any subsequent materials are brought into contact with it; the finished article carries a pattern in its exposed face corresponding to the pattern in which said first coating was applied to said mold surface.

References Cited in the file of this patent

UNITED STATES PATENTS

| 1,678,613 | Weiss | July 25, 1928 |
|---|---|---|
| 2,330,400 | Winder | Sept. 28, 1943 |
| 2,459,279 | Holden | Jan. 18, 1949 |
| 2,495,640 | Muskat | Jan. 24, 1950 |
| 2,545,832 | Wagers et al. | Mar. 20, 1951 |
| 2,614,955 | Halsall | Oct. 21, 1952 |
| 2,695,256 | De Olloqui et al. | Nov. 23, 1954 |
| 2,751,775 | Sergovic | June 26, 1956 |
| 2,752,275 | Raskin et al. | June 26, 1956 |

OTHER REFERENCES

"Tailor-made Polyester Resin Modern Plastics," October 1947, pages 111–115, page 111 particularly relied on.